United States Patent
Nemoto et al.

(10) Patent No.: US 7,250,863 B2
(45) Date of Patent: Jul. 31, 2007

(54) TRANSPONDER AND A SENSING SYSTEM USING THE TRANSPONDER

(75) Inventors: Ryo Nemoto, Kokubunji (JP); Tadashi Oonishi, Hachioji (JP); Kazuki Watanabe, Kokubunji (JP); Yoshiaki Yazawa, Nishitokyo (JP); Yasushi Goto, Kokubunji (JP); Hiroshi Yoshigi, Hinode (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 11/036,011

(22) Filed: Jan. 18, 2005

(65) Prior Publication Data

US 2006/0066451 A1 Mar. 30, 2006

(30) Foreign Application Priority Data

Sep. 16, 2004 (JP) ............................. 2004-269278

(51) Int. Cl.
*G08B 13/14* (2006.01)
(52) U.S. Cl. .................. 340/572.1; 235/487; 340/10.2; 340/10.52; 340/539.26
(58) Field of Classification Search ........... 340/539.26, 340/870.01, 572.1, 870.18, 870.17, 870.11, 340/870.03, 539.27, 539.12, 572.4, 505, 340/10.52, 7.46, 10.31, 7.45, 10.51, 10.1, 340/10.2; 235/487, 375, 492
See application file for complete search history.

(56) References Cited

U.S. PATENT DOCUMENTS 5,815,087 A * 9/1998 Campbell et al. ............ 340/5.6
5,929,801 A * 7/1999 Aslanidis et al. ............. 342/44
6,597,278 B1 * 7/2003 Ando ......................... 340/5.25
6,617,963 B1 9/2003 Watters et al.
7,011,250 B2 * 3/2006 Nakabe et al. .............. 235/487
2003/0130567 A1 * 7/2003 Mault et al. ................ 600/300

FOREIGN PATENT DOCUMENTS

| JP | 5-41888 | 2/1993 |
| JP | 05-041888 | 2/1993 |
| JP | 8-273088 | 10/1996 |
| JP | 10-293893 | 11/1998 |
| JP | 2000-224674 | 8/2000 |
| JP | 2002-538519 | 11/2002 |
| WO | WO 00/50849 | 8/2000 |

OTHER PUBLICATIONS

Japanese Notice of Reasons of Rejection of an Office Action dated Dec. 5, 2006, along with English translation of relevant portion.

* cited by examiner

*Primary Examiner*—Brent A. Swarthout
(74) *Attorney, Agent, or Firm*—Antonelli, Terry, Stout & Kraus, LLP.

(57) ABSTRACT

A measuring system enabled to simultaneously start measurement by a plurality of transponders by communication between a reader/writer and a plurality of transponders each with a built-in sensor is to be provided. In addition to an identifier SID intrinsic to a sensor and a chip identifier TID intrinsic to a transponder chip, a unique identifier UID combining the sensor SID and the chip TID is provided in each transponder. A reader/writer, in designating a transponder and transmitting a measurement command to it, invalidates the chip TID out of the UID of each transponder, validates only information regarding a sensor function, and transmits measurement commands including action commands unique to each type of sensor.

7 Claims, 10 Drawing Sheets

| COMMANDS | | CODES | ACTIONS |
|---|---|---|---|
| UID REQUEST COMMAND (Req_UID) | | C01 C02 | TRANSPONDER'S UID IS REQUESTED. |
| INITIALIZE EXECUTION COMMANDS | TEMPERATURE SENSOR INITIALIZE EXECUTION COMMAND (Th_SID) | C04 C03 C05 C06 | TRANSPONDER HAVING SID OF TEMPERATURE SENSOR IS CAUSED TO EXECUTE INITIALIZE ACTION. |
| | PHOTOSENSOR INITIALIZE EXECUTION COMMAND (Pho_SID) | C07 C03 C08 C09 | TRANSPONDER HAVING SID OF PHOTOSENSOR IS CAUSED TO EXECUTE INITIALIZE ACTION. |
| | pH SENSOR INITIALIZE EXECUTION COMMAND (pH_SID) | C010 C03 C011 C012 | TRANSPONDER HAVING SID OF pH SENSOR IS CAUSED TO EXECUTE INITIALIZE ACTION. |
| MEASUREMENT EXECUTION COMMANDS | TEMPERATURE SENSOR MEASUREMENT EXECUTION COMMAND (Meas_Th_SID) | C013 C03 C05 | TRANSPONDER HAVING SID OF TEMPERATURE SENSOR IS CAUSED TO PERFORM TEMPERATURE MEASUREMENT. |
| | PHOTOSENSOR MEASUREMENT EXECUTION COMMAND (Meas_Pho_SID) | C014 C03 C08 | TRANSPONDER HAVING SID OF PHOTOSENSOR IS CAUSED TO PERFORM OPTICAL MEASUREMENT. |
| | pH SENSOR MEASUREMENT EXECUTION COMMAND (Meas_pH_SID) | C015 C03 C011 | TRANSPONDER HAVING SID OF pH SENSOR IS CAUSED TO EXECUTE pH MEASUREMENT. |
| SENSED DATA REQUEST COMMAND (Req_Res1) | | C016 C03 | SENSED DATA FROM TRANSPONDER IS REQUESTED. |

| COMMANDS | CODES | ACTIONS |
|---|---|---|
| UID RETURN COMMAND (Res_UID) | C23 | UID IS RETURNED. |
| INITIALIZE/MEASUREMENT COMPLETION NOTIFYING COMMAND (Res_Comp1) | C21 | FLAG NOTIFYING THE END OF INITIALIZE/MEASUREMENT IS RETURNED. |
| SENSED DATA RETURN COMMAND (Res_Res1) | C22 | SENSED DATA IS RETURNED. |

APS: Adenosine 5'-phosphosulfate Sodium
ATP: Adenosine 5'-Triphosphate
PPi: Pyrophosphate Inorganic

TRANSPONDER AND A SENSING SYSTEM USING THE TRANSPONDER

CLAIM OF PRIORITY

The present application claims priority from Japanese application JP 2004-269278, filed on Sep. 16, 2004, the content of which is hereby incorporated by reference into this application.

BACKGROUND OF THE INVENTION

1. Field of the Invention

The present invention relates to a transponder, more particularly to a transponder, in particular to a transponder with a built-in sensor and a sensing system the transponder.

2. Description of the Related Art

Known ways of communication by a sensing system of this kind include communication using a reader/writer and a transponder. In this way of communication, the reader/writer utilizes the unique identifier (ID) of the transponder.

First, in order to identify individual transponders, the reader/writer has to cause each transponder to transmit its ID. Therefore, the reader/writer transmits to each transponder an identification command to have ID information sent.

In communication using a reader/writer and a transponder, if the reader/writer communicates back to a plurality of transponders at the same time, different signals will collide with one another. This would make it impossible for the reader/writer to recognize the ID of each transponder. To overcome this problem, in order to ensure accurate recognition of the ID of each transponder, the reader/writer is provided with a function to control return communication from transponders.

By utilizing this function, the reader/writer acquires the ID of every transponder. After completing the acquisition of IDs, the reader/writer sends a command to designate a transponder and have its internal processing done. After completing the internal processing, the transponder transmits to the reader/writer a message to notify the completion.

Upon confirmation of the completion of internal processing by the transponder, the reader/writer transmits and receives similar information to and from another transponder and repeats this procedure until such transmission/reception is completed for every transponder.

The presence of a sensor built into a transponder makes it possible for the sensed result by communication. Further, the transponder with the built-in sensor can be reduced in size to about the dimensions of an integrated circuit size by using semiconductor integrated circuit technology for its configuration. The smaller the size of the transponder is, the greater the variety of purposes it can be applied to.

Incidentally, known examples of the prior art of data processing system between a plurality of transponders and one reader/writer or of a processing system using wireless communication between a plurality of handsets and a base unit include the following.

Japanese Patent Application Laid-Open No. 2000-224674 (Patent document 1), relating to a radio telemeter system, discloses a radio telemeter system, including a base unit and a handset constitutes a group, by which the discrimination of a radio unit is accomplished more quickly by transmitting a signal specifying the group (group ID) following a communication synchronizing signal (radio header) and the reception is started with the group specifying signal thereby to reduce the duration of the state of reception.

Japanese Patent Application Laid-Open No. Hei 10-293893 (Patent document 2), relating to a radio meter inspection method for consecutively collecting information from meters connected to a handset, discloses a method according to which an external device and a base unit are line-connected, the base unit and a handset are connected by a wireless line under the control of the external device, the line connection between the external device and the base unit is not cut off after the completion of the collection of measurement information from a measuring tool connected to the handset, but the base unit is wireless-connected again to another handset under the control of the external device and continues to collect the next set of measurement information from the measuring tool connected to that other handset.

Japanese Patent Application Laid-Open No. Hei 08-273088 (Patent document 3), relating to a radio meter inspection method of inspecting measuring tools such as city water meters or city gas meters by using electric waves, discloses a method according to which the meter to respond is specified by transmitting in a meter inspection request telegraphic message a few designated ones among the digits of the ID number of each of the meters to be collectively inspected, such digits being successively transmitted for these meters, and each meter having received the inspection telegraphic message, if the ID containing the designated digits is found identical with its own ID, returns the reading of the meter following the sequence of the transmitted IDs.

Japanese Patent Application Laid-Open No. Hei 05-041888 (Patent document 4), relating to a broadband data collection system, discloses a broad band data collection system including individual house data sending means, provided for each house, for converting the data of the consumed quantity of electric power, city water or city gas into a required high frequency signal and sending it byway of an electric wave; small group data receiving means, provided for each group consisting of a plurality of houses, for receiving the electric wave from the individual house data sending means and demodulating it into data; and broad band data collecting means for collecting the data on individual houses received by a plurality of the small group data receiving means via a communication line or the like, wherein the individual house data sending means is provided with a memory unit for storing house codes preset for the identification of houses and type codes preset for the identification of data types, and an identification code matching the house code and the type code read out of the memory unit is added to the head or the like of each set of data and sent out.

Patent document 1: Japanese Patent Application Laid-Open No. 2000-224674

Patent document 2: Japanese Patent Application Laid-Open No. Hei 10-293893 Patent document 3: Japanese Patent Application Laid-Open No. Hei 08-273088

Patent document 4: Japanese Patent Application Laid-Open No. Hei 05-041888

SUMMARY OF THE INVENTION

Along with the increasing fineness of semiconductor processes to produce ever smaller sensors, the influence of fluctuations in elements and like phenomena becomes too great to ignore. Though compensation can be made to some extent by equipping the sensor itself with an error compensation function, with a rise in the level of accuracy required it becomes difficult for the sensor's own compensation function alone to meet the requirement. To overcome this difficulty, the influence of fluctuations in elements and the like can be reduced by using a plurality of transponders each with a built-in sensor of the same kind, in addition to relying on the sensor's own compensation function, and averaging the sensed data from the individual sensors. The compensation function and the average can give data substantially equal to what should essentially to be measured.

Figure 1:
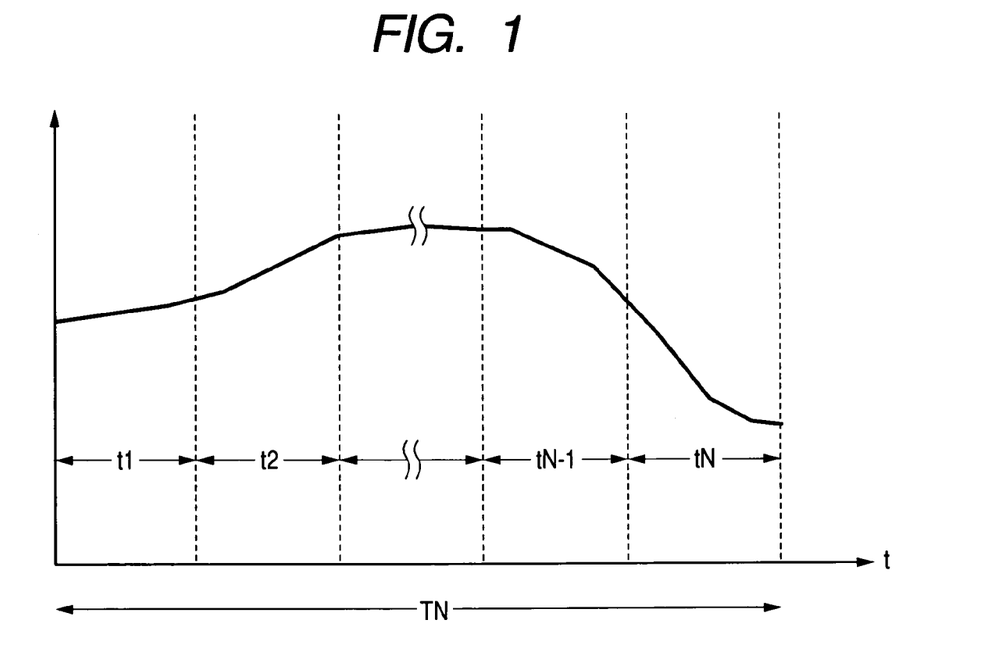
FIG. 1 shows a case in which the value of a measurement item varies with the lapse of time.

FIG. 1 shows a case in which the value of a measurement item varies with the lapse of time. The transverse axis represents the time, and the vertical axis represents the value of the measurement item. When a measurement instruction or a command to read sensed data is to be transmitted to a transponder which is to measure a measurement item, the ID of the transponder can be used. Where the value of the measurement item varies with the lapse of time as shown in FIG. 1, if measurement commands and read commands are transmitted and received to and from one at a time of N transponders while designating each transponder by using this ID, the value of the measuring object during the time segment t1 in which a first transponder performs measurement, the value of the measurement item during the time segment t2 in which a second transponder performs measurement, . . . , the value of the measurement item during the time segment t (N-1) in which an (N-1)-th transponder performs measurement, and the value of the measurement item during the time segment tN in which an N-th transponder performs measurement all differ from one another. Therefore, according to this method, each transponder measures the value of the measurement item in a different time segment but cannot measure the measurement item in the same time segment. Furthermore, if the sensed data measured by different transponders is averaged, it is not sensed in the same time segment, but the data sensed by the transponders in the same time segment cannot be averaged.

Thus, by a method by which transponders are designated by using their respective unique IDs, where a plurality of sensors are used, the plurality of sensors cannot perform measurement at the same time. For this reason, a kind of measurement item shown in FIG. 1 cannot take advantage of measuring using a plurality of transponders.

One typical example of means provided by the present invention to solve the problem note above is described below. A transponder according to the invention has a first coil antenna; a communication block which communicates with a reader/writer via the first coil antenna; a sensor block having a sensor performing a prescribed measurement; and a chip control block for controlling the communication block and the sensor block, wherein the sensor block has a sensor identifier intrinsic to the sensor; the chip control block has a transponder chip identifier intrinsic to the transponder and has a unique identifier combining the transponder chip identifier and the sensor identifier.

DETAILED DESCRIPTION OF THE PREFERRED EMBODIMENTS

A preferred embodiment of the present invention will be described in detail below with reference to the accompanying drawings.

Embodiment

Figure 2:
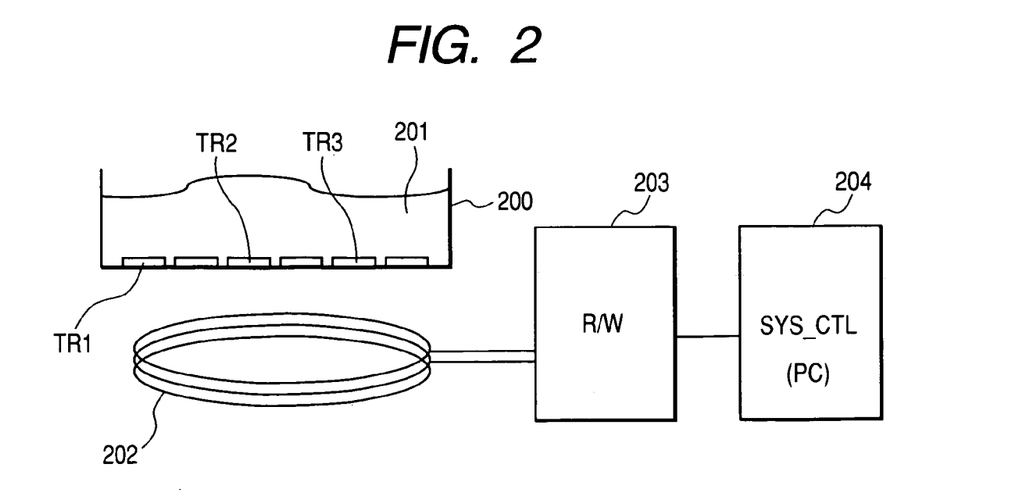
FIG. 2 shows the configuration of a wireless bio-measuring system.

As a measuring system using a plurality of transponder, FIG. 2 shows the configuration of a measuring system for detecting a bio-molecule such as DNA or protein by measuring bioluminescence.

Referring to FIG. 2, a solution 201 in a reaction chamber 200 contains a plurality of types of transponders TR1, TR2 and TR3, each of which has a sensor built into each and performs wireless transmission/ reception to and from a reader/writer of measured data and commands from the reader/writer.

In the configuration shown in FIG. 2, a plurality each of three types of transponders TR1, TR2 and TR3, which respectively are temperature sensors (Th sensors) for measuring temperatures in the solution, pH sensors for detecting ion concentrations in the solution, and photosensors (Phosensors) for detecting DNAs by bioluminescence, are placed in the solution, the measuring objects being examples of sensed data required for distinguishing the types of DNAs. Incidentally, since illustration of many different transponders would be confusing, FIG. 2 is merely intended to show the presence of a plurality each of three types of transponders, but is not intended to limit the variety of transponders. Obviously, many more transponder chips can be used in order to enhance the accuracy of sensed data.

This measuring system includes a reader/writer (R/W) 203 which communicates with these transponders in the solution via a coil antenna 202, and an application system device (SYS_CTL) 204 which, consisting of a personal computer (PC), controls the reader/writer, processes acquired sensed data and distinguishes the sensed data.

Figure 3:
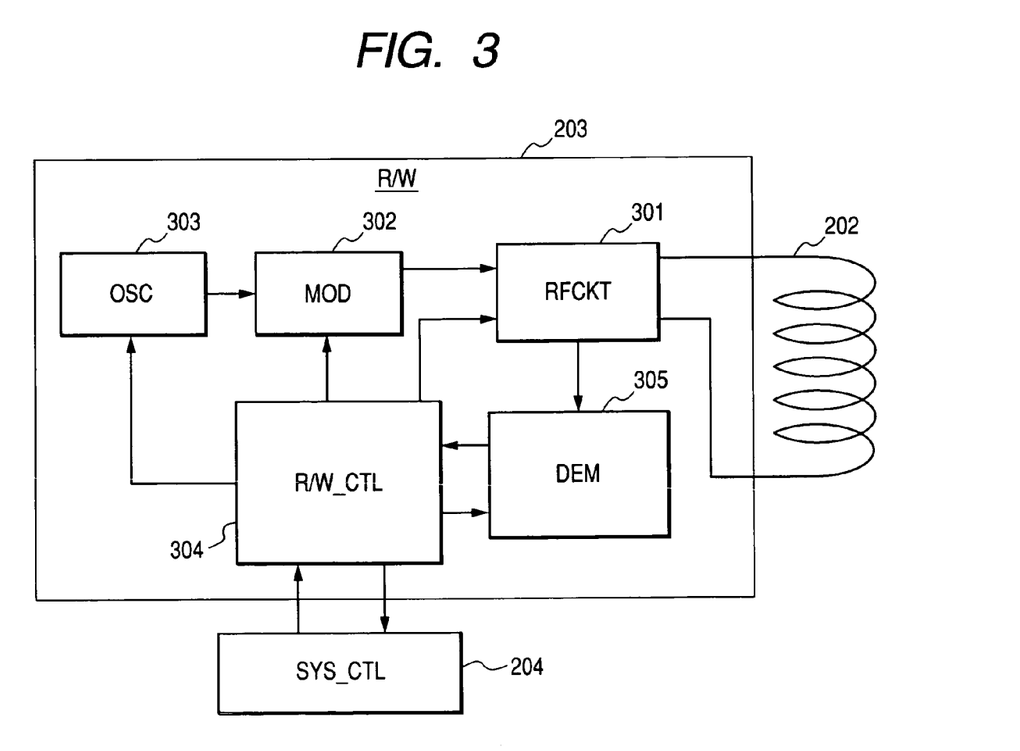
FIG. 3 is a block diagram showing the internal structure of a reader/writer.

FIG. 3 is a block diagram showing the internal structure of the reader/writer 203. The reader/writer includes a radio communication circuit (RFCKT) 301 to which the coil antenna 202 for communicating with transponders is connected, an oscillator (OSC) 303 whose oscillation frequency is controlled by a control circuit (R/W_CTL) 304, a modulator (MOD) 302 for modulating the carrier generated by the oscillator 303 and sending the modulated carrier to the radio communication circuit, and a demodulator (DEM) 305 for demodulating signals which are sent from the transponder having received them by the radio communication circuit via the coil antenna 202. The control circuit here controls the modulation frequency of the modulator and the RF frequency of the RF communication circuit on the basis of a control signal from the application system device (SYS_CTL) 204 outside the reader/writer.

Figure 4:
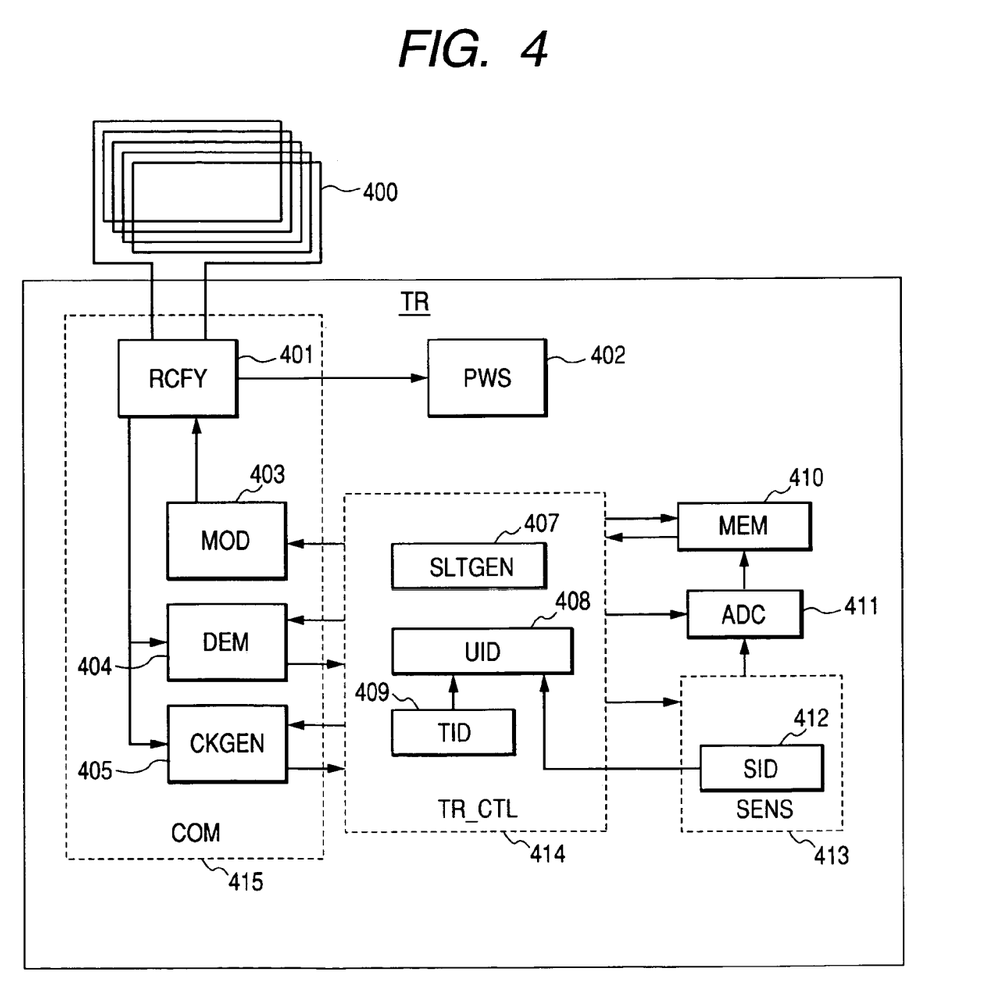
FIG. 4 is a block diagram showing a schematic structure of transponders.

FIG. 4 is a block diagram showing the internal structure of the transponders TR1, TR2 and TR3. An electromagnetic wave transmitted from the reader/writer 203 is received by a coil antenna 400, rectified by a rectifier (RCFY) 401, and stabilized by a power supply circuit (PWS) 402 to be stabilized. This stabilized power is supplied to the circuits in the transponders as power for the transponders (the illustration of power supply lines is dispensed with in FIG. 4).

Further, the electromagnetic wave received by the coil antenna 400 is sent to a demodulator (DEM) 404 and a clock generator (CKGEN) 405 to undergo signal demodulation and to have clock signals for intra-transponder use, respectively. The modulator (MOD) modulates various commands and data sent our from a control block (TR_CTL) 414 via the coil antenna 400. The rectifier, demodulator, clock generator and modulator constitute a communication block (COM) 415 for communicating with the reader/writer.

A sensor block (SENS) 413 measures such measuring objects as the temperature, luminous intensity and pH in the reaction chamber. Analog data, which is sensed data detected by the sensor block is converted into digital data by an analog-to-digital converter (ADC) 411, and the converted data is stored in a memory (MEM) 410.

The control block (TR_CTL) 414 controls the demodulator, clock generator, sensor block, analog-to-digital converter and memory. The control block has a slot generator (SLTGEN) 407 for preventing collision in ID discrimination when communicating with the reader/writer 203.

The sensor block has sensor identifiers (SID) 412. The sensor identifiers are information indicating the measuring objects of the sensor block, and one sensor identifier is allocated to each measuring object. For instance, transponders each having a sensor block whose measuring object is temperature have a common sensor identifier. Transponders each having a sensor block whose measuring object is temperature and transponders each having a sensor block whose measuring object is light have different sensor identifiers. Therefore, by specifying a sensor identifier, transponders having sensor blocks for measuring the same measuring object can be designated at one and the same time.

The control block has a transponder chip identifier (TID) 409 which is the unique ID of a chip constituting a transponder and a unique identifier (UID) 408 which, combining a transponder chip identifier and a sensor identifier, is unique to each transponder. Thus, different transponders have different transponder chip identifiers and different unique identifiers.

Figure 5A:
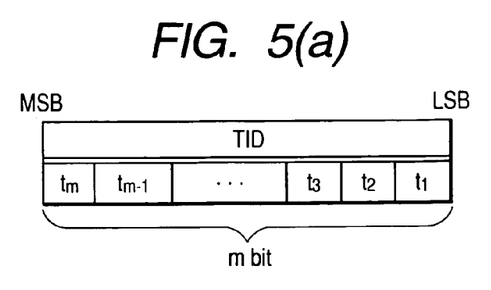
FIGS. 5(a) to 5(c) show relationships among a transponder chip identifier, a sensor identifier and a unique identifier.
Figure 5B:
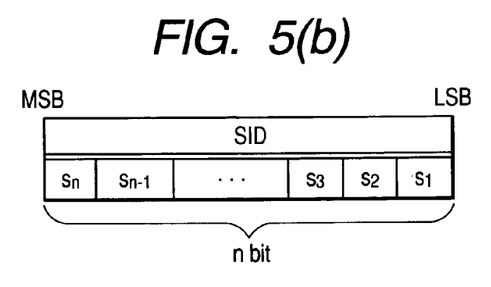
Figure 5C:
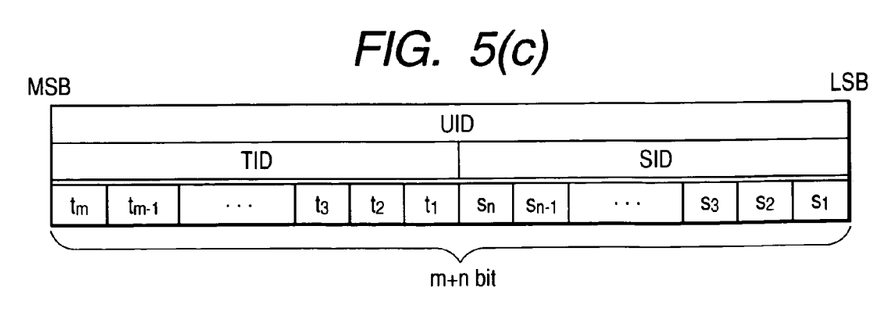

FIG. 5(*a*) shows a transponder chip identifier (TID), FIG. 5(*b*), a sensor identifier (SID) and FIG. 5(*c*), a unique identifier (UID). If, for instance the TID consists of m-bit data, and the SID consists of n-bit data, the UID will be linked data of the TID and the UID. The relationship between the UID on one hand and the TID and the SID on the other is not limited to linkage, but it may be any relationship that enables the UID to be specified by the TID and the SID.

Although the embodiment shown FIG. 4 has only one sensor block, there may be a plurality of types of sensor blocks differing in the measuring object. In this case, the transponder will have a plurality each of sensor identifiers and transponder chip identifiers matching the plurality of types of measuring objects.

Figure 6:
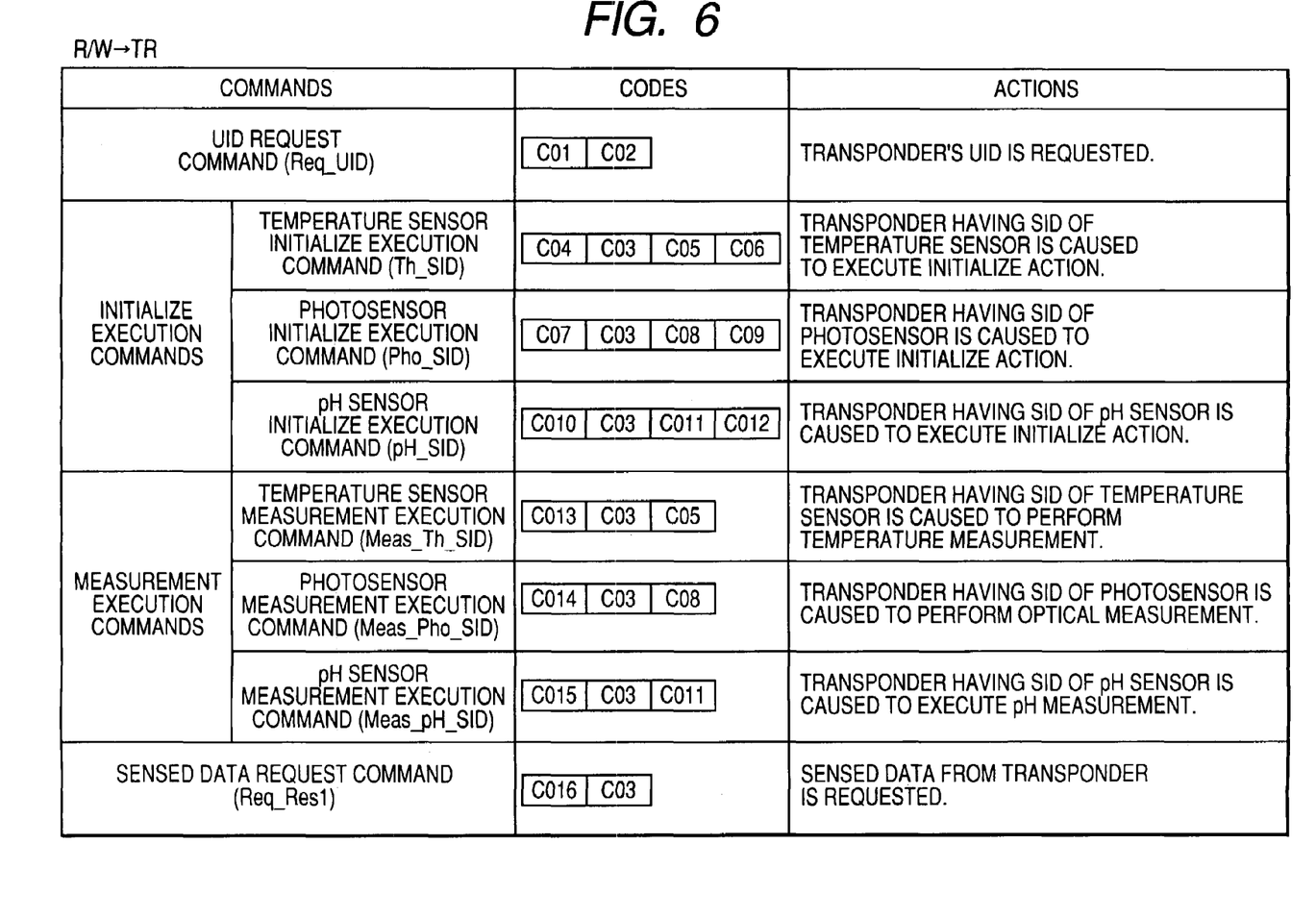
FIG. 6 shows commands transmitted from a reader/writer to a transponder together with descriptions of the actions demanded by them.

FIG. 6 shows commands transmitted from the reader/writer (R/W) to a transponder (TR) together with descriptions of the actions demanded by them.

Figure 8:
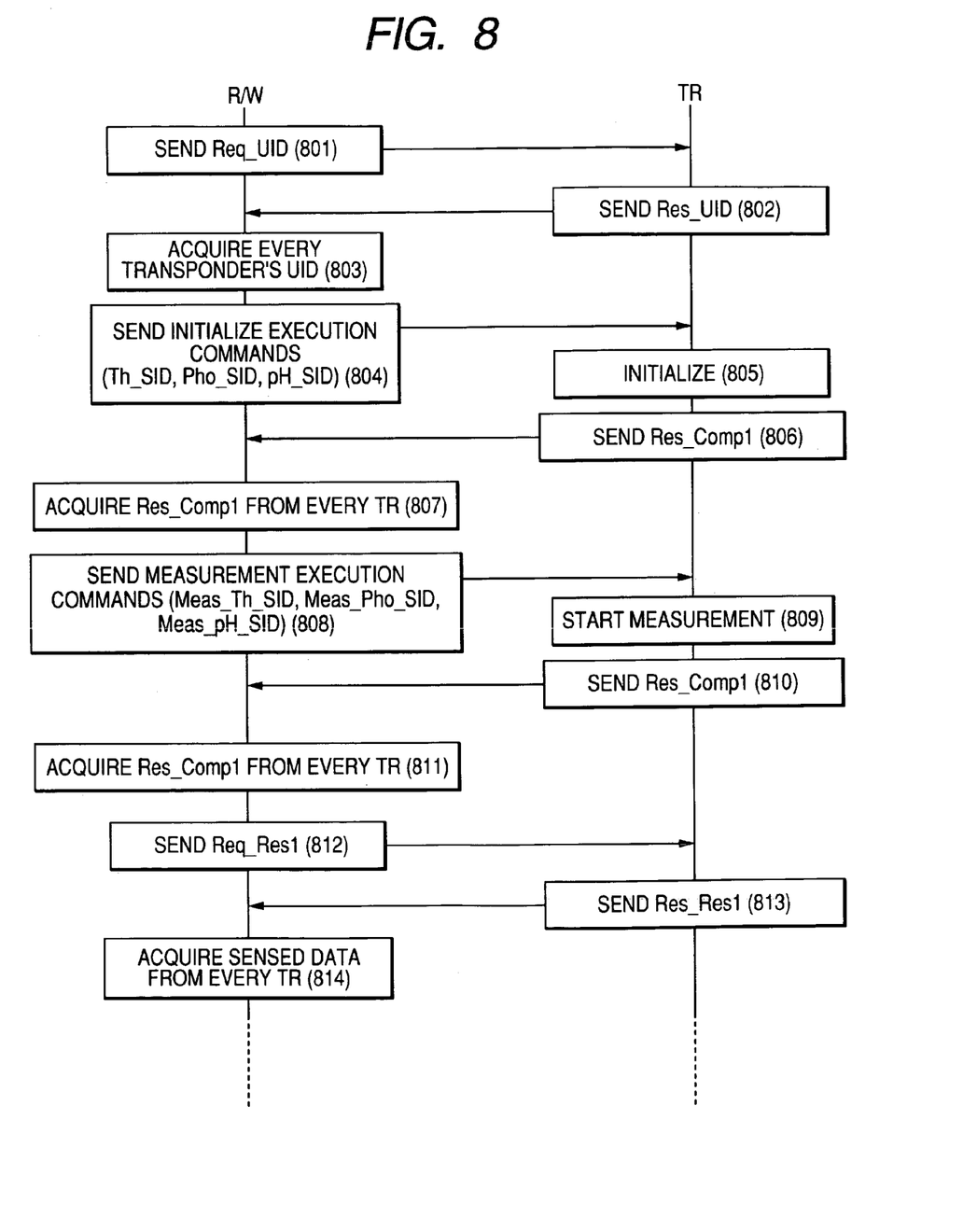
FIG. 8 is a ladder chart schematically showing measurement actions between the reader/writer and the transponders.
Figure 9:
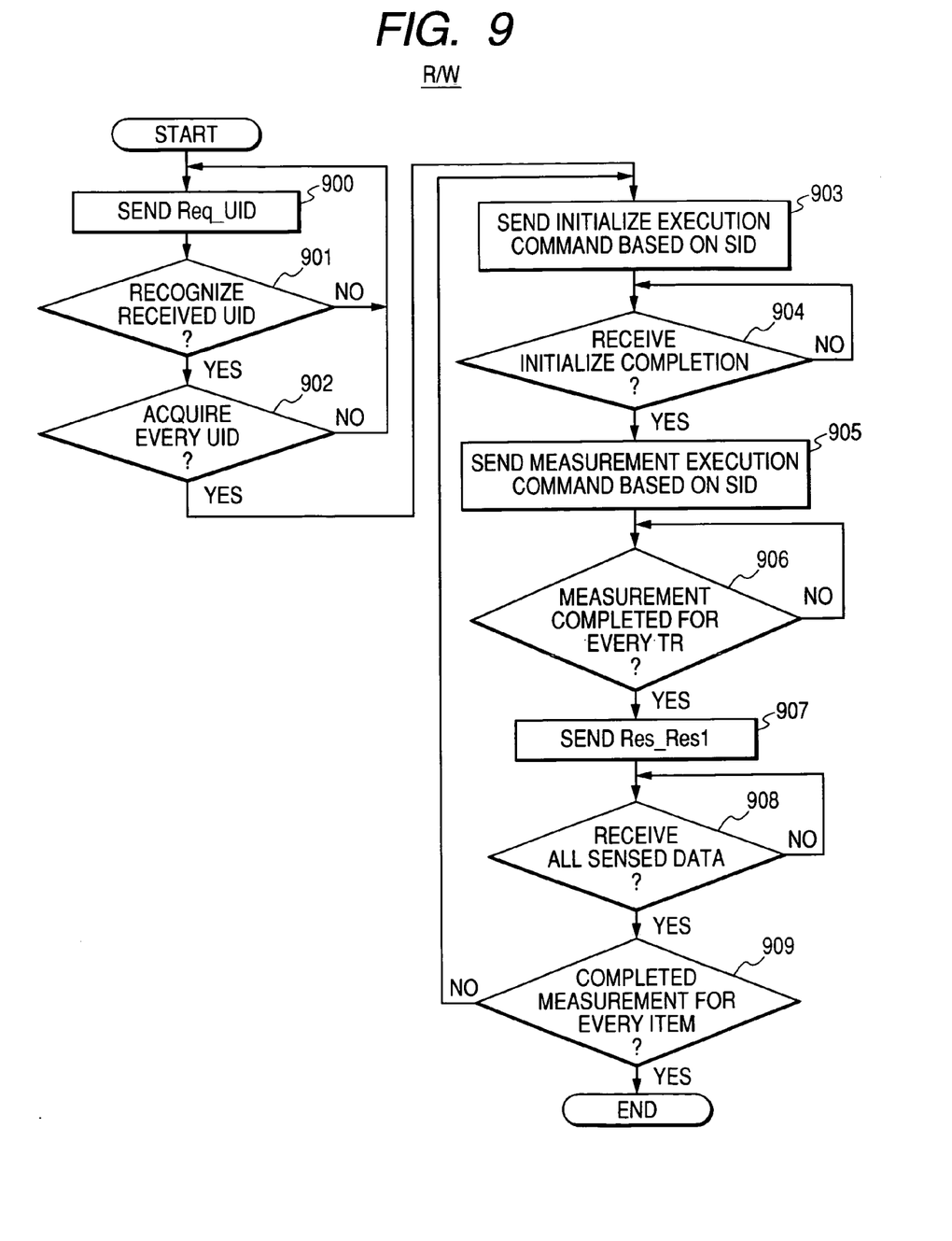
FIG. 9 is a flow chart showing actions on the reader/writer side.

A unique identifier request command (Req_UID) is represented by codes CO1 and CO2 and, before conducting measurement, namely at steps 801 through 803 shown in FIG. 8 and steps 900 through 902 shown in FIG. 9, requests the identifier UID of the transponder. Code CO1 represents a slot for collation, and Code CO2 has a function to generate a slot within the transponder and, if the slot generated in the transponder and the slot for collation CO1 are found identical, to transmit the UID to the reader/writer. CO1 varies at regular intervals (e.g. from 000 to 001, 010 . . . ), and the intervals and cycle of the variation are controlled on the part of the reader/writer. When CO2 is received, the transponder generates a slot, utilizing part of the UID as an element of slot generation (e.g. part of the UID is used as it is as the slot for collation).

Which part of the UID is to be designated is controlled on the part of the reader/writer. In the event of return signal collision at step 901, the $Req_{13}$ UID is transmitted once again after the lapse of one cycle. In this case, the part of the UID to be used in generating a slot should be different from the previously used part (if, for instance, S1, S2 and S3 were used in the first cycle, CO2 will be so controlled as to use S4, S5 and S6 in the next cycle).

Basically, the transponder executes, upon receiving its own unique identifier, an action designated by the action code. However, as long as it is receiving action commands regarding measurement and acting accordingly, it invalidates the transponder chip identifier, namely it acts when receiving its own sensor identifier.

To describe steps 804 through 807, initialize execution commands which R/W transmits to each transponder to cause initialization to be executed at steps 903 and 904 are shown.

As shown in FIG. 6, a temperature sensor initialize execution command (Th_SID) consists of Codes CO4, CO3, CO5 and CO6. Code CO4 represents the SID action code of the Th sensor; Code CO3 represents the TID; Code CO5 represents the SID of the temperature sensor; and Code CO6 represents the parameter of the temperature sensor. Th_SID is a command for causing only the transponders having a Th sensor (temperature sensor) each to simultaneously execute initialization. Code CO4 has a function to perform initialization including that of the temperature sensor and to invalidate the transponder chip identifier TID constituting the UID (i.e. validating only the sensor identifier SID) between steps 1004 and 1007 charted in FIG. 10.

A photosensor initialize execution command (Pho_SID) consists of Codes CO7, CO3, CO8 and CO9 (see FIG. 6). Code CO7 represents the SID action code of the Pho-sensor; Code CO3 represents the TID; and Code CO8 represents the SID of the Pho-sensor; and Code CO9 represents the parameter of the Pho-sensor. Pho_SID is a command for causing only the transponders having a Pho-sensor each to simultaneously execute initialization. Code CO7 has a function to perform initialization including that of the photosensor and to invalidate the chip identifier TID constituting the UID between steps 1004 and 1007.

A pH sensor initialize execution command (pH_SID) consists of Codes CO10, CO3, CO11 and CO12. Code CO10 represents the pH_SID action code; Code CO3 represents the TID; Code CO11 represents the pH sensor SID; and Code CO12 represents the parameter of the pH sensor. pH_SID is a command for causing only the transponders having a pH sensor each to simultaneously execute initialization. Code CO10 has a function to perform initialization including that of the pH sensor and to invalidate the chip TID constituting the UID between steps 1004 and 1007.

After the initialization, measurement is carried out. To describe steps 808 through 811, measurement execution commands which R/W transmits to the sensor block of each transponder to cause measurement to be performed, sensed data to be converted into digital data and the converted data to be stored into the memory 410 at steps 905 and 906 are shown.

A temperature sensor measurement execution command (Meas_Th_SID) consists of Codes CO13, CO3 and CO5. Code CO13 represents the Meas_Th_SID action code of the Th sensor; CO3 represents the TID; and CO5 represents the temperature sensor SID. Meas_Th_SID is a command for causing only the transponders having a Th sensor each to simultaneously execute the process from measurement to the storing of sensed data. Code CO13 has a function to execute measurement and to invalidate the transponder chip identifier TID constituting the UID (i.e. to validate only the sensor identifier SID) at steps 1008 through 1011.

A photosensor measurement execution command (Meas_Pho_SID) consists of Codes CO14, CO3 and CO8. Code CO14 represents the Meas_Pho_SID action code of the Pho-sensor; Code CO3 represents the TID; and CO8 represents the Pho-sensor SID. Meas_Pho_SID is a command for causing only the transponders having a Pho-sensor each to simultaneously execute storing of the sensed data. Code CO14 has a function to execute measurement and to invalidate the chip identifier TID constituting the UID (i.e. to validate only the sensor identifier SID) at steps 1008 through 1011.

A pH sensor measurement execution command (Meas_pH_SID) consists of Codes CO15, CO3 and CO11. Code CO15 represents the Meas_pH_SID action code of the pH sensor; Code CO3 represents the TID; and CO11 represents the pH sensor SID. Meas_pH_SID is a command for causing only the transponders having a pH sensor each to simultaneously execute the process from measurement to the storing of sensed data. Code CO15 has a function to execute measurement and to invalidate the chip identifier TID constituting the UID (i.e. to validate only the sensor identifier SID) at steps 1008 through 1011.

Where each transponder is provided with a sensor block having any other measuring object than temperature, light and pH, initialize execution commands and measurement execution commands for such other measuring object will be made available.

A sensed data request command (Req_Resl) is a command to request each transponder for sensed data. Code CO16 is an instruction to transmit sensed data stored in the memory 410, and Code CO3 represents the TID. Although the UID is usually used for designating a transponder, the TID may as well be used because it is also unique to each transponder and R/W can derive from the acquired UID the sensor information built into each transponder.

Figure 7:
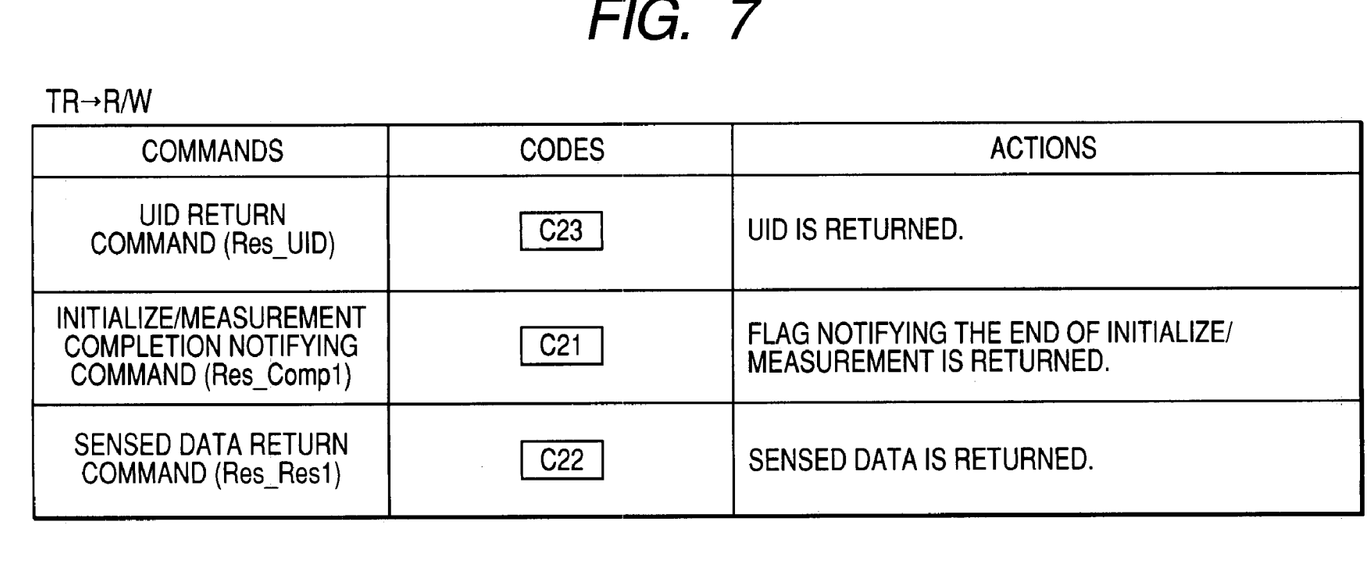
FIG. 7 shows an example of command returned from the transponder to the reader/writer together with its contents.

FIG. 7 shows a command the transponder (TR) transmits to the reader/writer (R/W), its codes and the descriptions of actions involved. Code C23 is sent to the reader/writer at step 802 and step 1002, and, contains the UID combining the TID and the SID. Code C21 is sent to the reader/writer at steps 806 and 1007 and at steps 810 and 1011. Code C22 is transmitted to the reader/writer at steps 813 and 1014.

FIG. 8 is a ladder chart schematically showing measurement actions between the reader/writer and the transponders TR.

First, the reader/writer 203 transmits a UID request command Req_UID to acquire from each transponder chip the transponder identifier UID in the reaction chamber (801).

Upon receiving the command Req_UID, if the transponder determines that the transmitted slot and the slot within the transponder are identical, that transponder will send the UID to the reader/writer. Incidentally, generation of a slot in a transponder utilizes the UID (e.g. utilizes part of the UID as it is).

The reader/writer judges that no more UID is received from the transponder side, every UID has been acquired (803).

Next, the reader/writer transmits to a transponder initialize execution commands to have the transponder perform actions to initialize Th_SID, Pho_SID, pH_SID and so forth. For instance, if the transponder is to execute temperature measurement, Th_SID, which is an initialize execution command based on the SID of the temperature sensor, will be transmitted.

The transponder in the reaction chamber having received the initialize execution command compares the SID designated by the initialize execution command and the SID in the transponder and, if they are found identical, will start initialize actions (for a photosensor, for instance, charging and discharging by irradiation with light) (805). In this case, all the transponders which are within the effective electric wave area of the reader/writer and have the SID designated by the initialize execution command will perform initialize actions at the same time.

Each transponder having completed initialization transmits to the reader/writer an initialize completion notifying command Res_Compl for notifying the completion of initialization (806).

The reader/writer receives Res_Compl from every transponder having the SID designated by the initialize execution command (807).

After that, the reader/writer transmits to each transponder a measurement execution command to cause sensors in the transponder, such as Meas_Th_SID, Meas_Pho_SID and Meas_pH_SID, to perform measurement (808). If, for instance, temperature measurement is to be done by a transponder, the reader/writer transmits Meas_Th_SID, which is an initialize execution command based on the SID of the temperature sensor.

The transponder receives the measurement execution command and, if the SID designated by the measurement execution command and the SID in the transponder are found identical, will actuate the sensor and start measurement (809). In this case, all the transponders having the SID designated by the measurement execution command will simultaneously actuate their sensors and start measurement.

Each transponder having completed measurement transmits to the reader/writer a measurement completion notifying command Res_Compl for notifying the completion of measurement (810).

The reader/writer receives Res_Compl from every transponder having the SID designated by the measurement execution command (811).

After that, the reader/writer transmits to the sensor Th transponder a sensed data request command Req_Resl for reading sensed temperature data stored by the transponder into the memory (812).

Each transponder having received the sensed data request command, if the UID designated by the sensed data request command and the UID in the transponder are found identical, will transmit a sensed data transmit command Req_Resl to the reader/writer (813). In this case, sensed data will be transmitted to the reader/writer sequentially from transponders having the UID designated by the sensed data request command.

The reader/writer ends measurement when it has acquired sensed data from every transponder designated by the sensed data request command.

It is possible here to designate and measure different measurement items such as temperature, light and pH by replacing the SID designated by the initialize execution command and measurement execution command with an SID designating a temperature sensor, an SID designating a photosensor or an SID designating a pH sensor and repeating the procedure from (803) through (814).

FIG. 9 is a flow chart showing actions by the reader/writer 203 in more detail.

First, the reader/writer 203, in order to acquire the identifiers UID of transponders in the reaction chamber from the transponder chip, transmits a UID request command Req_UID (900).

On the part of the reader/writer, the transponder UIDs returned from the transponders are recognized and stored into the memory. For UIDs which are not recognizable (NO), the process returns to step 900, and the UID request command Req_UID is transmitted again (901).

Since each transponder completes UID transmission when it returns the UID and the reader/writer 203 recognizes it, the reader/writer judges that it has acquired every UID when no more UID is received from the transponder side (902).

Next, the reader/writer transmits an initialize execution command based on an SID (903). If, for instance, the transponder is to execute temperature measurement, the reader/writer will transmit Th_SID which is a command designated by the SID of the temperature sensor and to cause initialization to be executed.

The reader/writer receives from each transponder a initialize completion command Res_Compl (904).

After that, it transmits to the transponder an measurement execution command based on the SID (905). If, for instance, the transponder is to execute temperature measurement, the reader/writer will transmit Meas_Th_SID, which is a command designated by the SID of the temperature sensor and cause measurement to be executed.

The reader/writer receives from each transponder a completion command Res_Compl notifying the completion of temperature measurement (906). Then it transmits to the sensor Th transponder a command Req_Resl to enable each transponder to read sensed temperature data stored in the memory (907).

The reader/writer, if it has acquired all the sensed temperature data, will complete temperature measurement (908).

The reader/writer checks whether not the measurement of every item has been completed (909) and, if data on every measurement item have been acquired, will complete measurement, but if any item remains to be measured, will return to step 1003 for the next measurement item and measure that next item.

Figure 10:
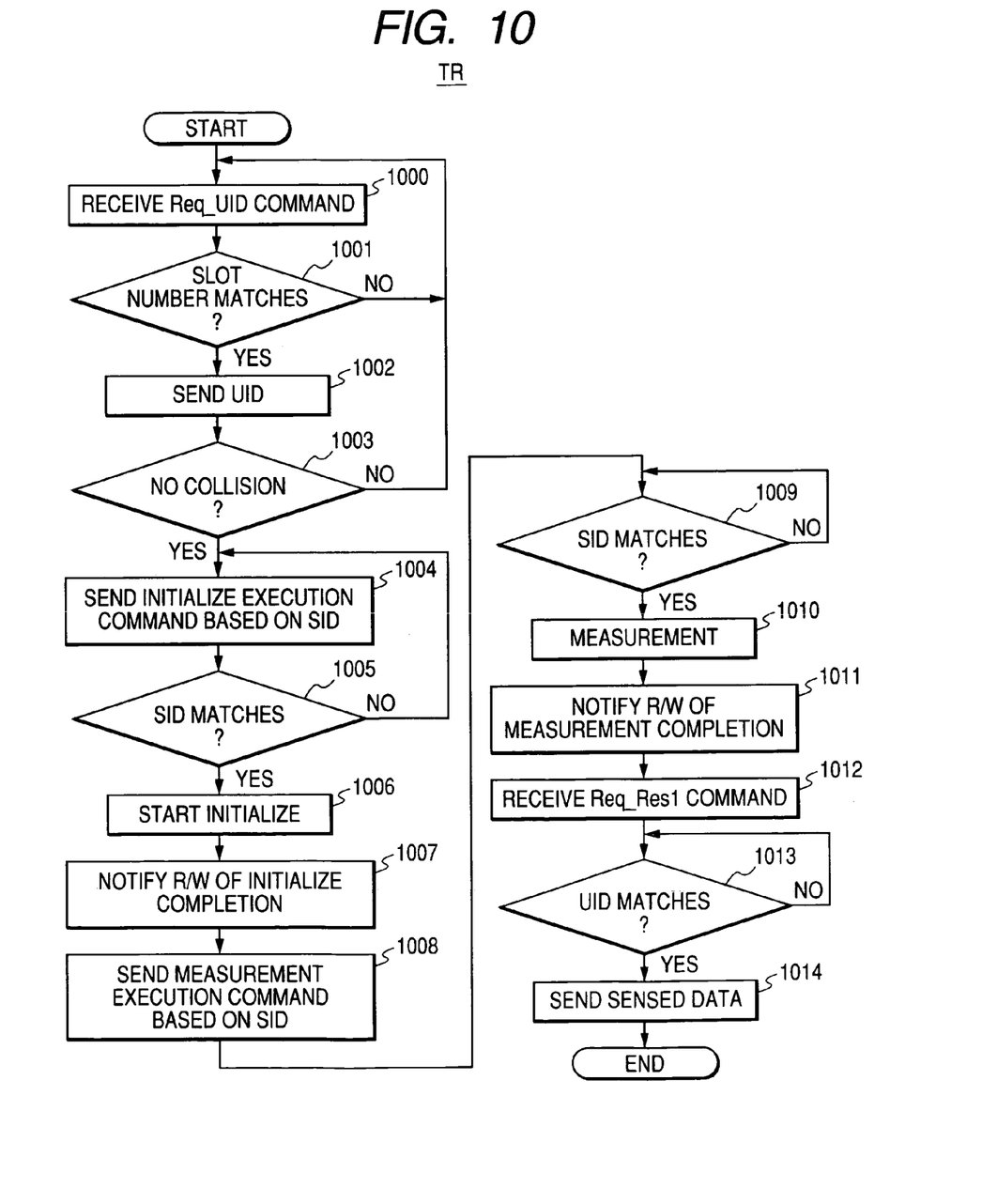
FIG. 10 is a flow chart showing actions by the transponder.

FIG. 10 is a flow chart showing actions by the transponder.

If a transponder receives a command Req_UID (1000), checks identity of slots and finds them identical (1001), that transponder transmits the UID to the reader/writer side (1002); if any collision occurs on the part of the reader/writer, will return to (1000) and receive a Req_UID command again or, if there is no collision, stand by until an initialize command is received (1003).

The transponder (1004) compares the SID designated by the initialize execution command with the SID in the transponder (1005) and, if it finds them identical, will start initializing actions (1006). If, for instance, it is Meas_Th_SID, which is a command designated by the SID of the temperature sensor and cause measurement to be executed, every transponder having a temperature sensor will start initializing actions simultaneously.

Each transponder sends to the reader/writer a completion command Res_Compl (Code C21) notifying the completion of initialization (1007).

Then, the transponder receives a measurement execution command (1008). The transponder compares the SID designated by the measurement execution command with the SID in the transponder (1009) and, if it finds them identical, will start measurement with the sensor block (1010). Each transponder having completed measurement transmits a completion command Res_Compl to notify the reader/writer of the completion of measurement (1011).

The Th transponder, upon reception of a command Req_Resl (1012), determines the identity of the UID (1013) and, after transmitting sensed data to the reader/writer sequentially from transponders whose UIDs have been found identical (1014), completes actions.

As hitherto described, this embodiment of the invention enables transponders with built-in sensors having the same sensor identifier SID to act simultaneously by providing within each transponder a unique identifier UID, which is an identifier combining the transponder chip identifier TID of the transponder and the sensor identifier SID and invalidating chip information TID against a sensor measurement instruction. Therefore, it is made possible to prevent any sensor whose sensor identifier SID is unidentical from starting measurement and detecting wrong sensed data.

In this way, transponders with built-in sensors of the same type simultaneously start measurement in each measuring action at a measurement command from the reader/writer by measurement command, by a measurement command Meas_Th_SID based on the identifier SID of the temperature sensor if the temperature is to be measured, by a photo-measurement command Meas_Pho_SID if the light is to be measure or by a pH measurement command Meas_pH_SID if pH is to be measured. Therefore, even if the characteristic value of a measurement item varies with the lapse of time as shown in FIG. 1, measurement using a plurality of transponders can be accomplished in each time segment tN in which the measurement should be performed, enabling N sets of sensed data to be acquired at the same point of time. This makes possible acquisition of average data at the same point of time, and the averaging of a plurality of sets of sensed data at the same point of time enables more accurate data to be obtained for each measurement item. Furthermore, by making use of the compensation function which the sensor of each transponder has, more accurate and reliable sensed data can be acquired.

Figure 11A:
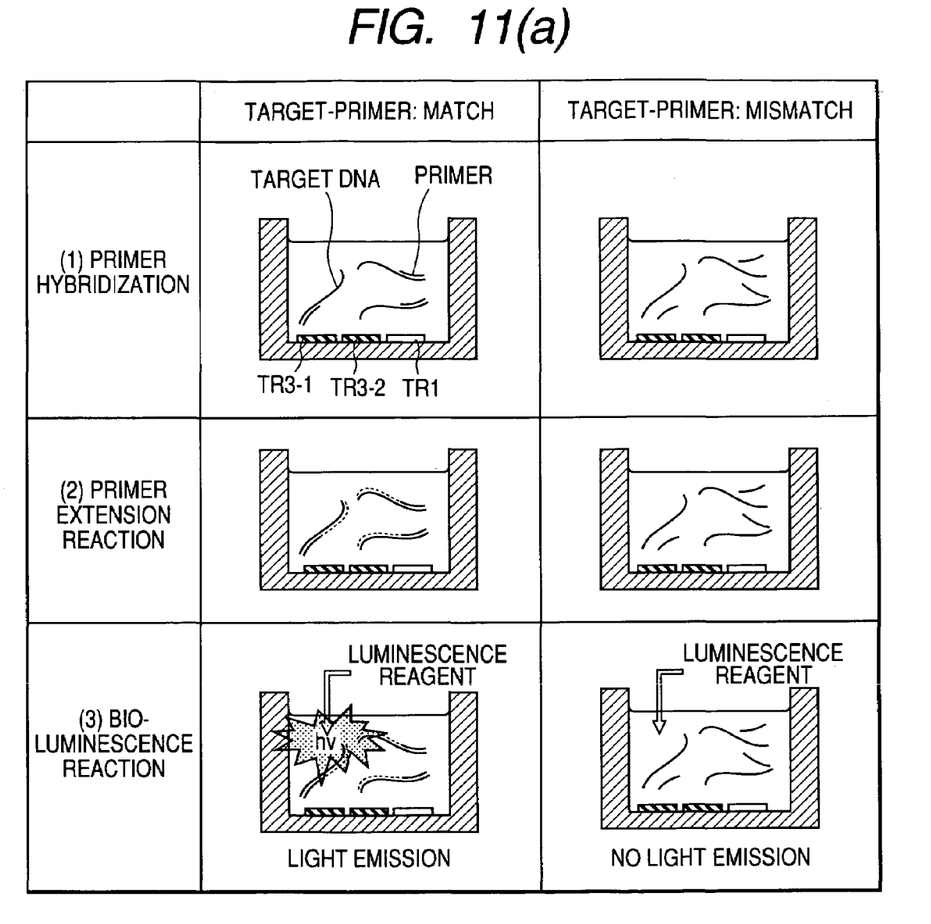
FIGS. 11(a) and 11(b) show an example of implementation of DNA detection by bioluminescence.
Figure 11B:
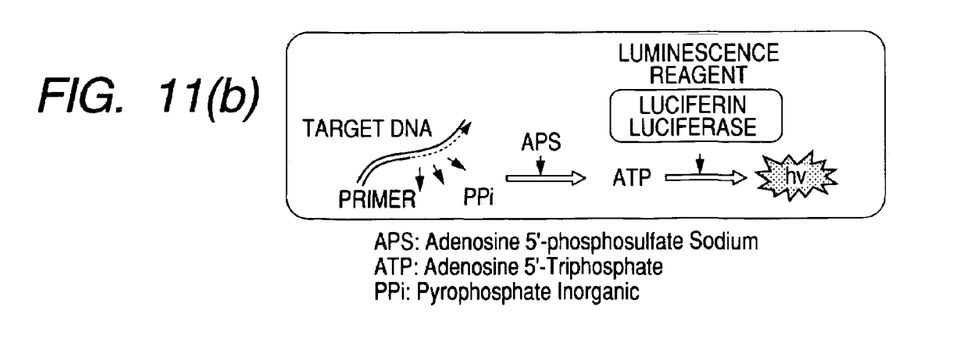

FIG. 11 show an example of implementation of DNA detection by bioluminescence. A primer which singularly combines with the object region of a DNA is hybridized with the target DNA ((1) in FIG. 11(a)). When a singular combination takes place, the extending reaction of the DNA causes pyrophosphoric acid (PPi) to be discharged. The PPi is converted into ATP in the presence of APS and sulfurylase, and bioluminescence is generated by luminescence reagent luciferin-luciferase (see (3) in FIG. 11(a) and FIG. 11(b)). Unless the primer and the target become singularly combined, no extending reaction will occur and no PPi will be discharged, resulting in the absence of luminescence. Therefore, the type of DNA can be determined according to the presence or absence or, if present, the relative intensity of luminescence. If the quantity of the reagent is small, PPi will also be small, necessitating accurate measurement of feeble light. In such a case, the accuracy of data can be enhanced by using a plurality of photosensor transponders. In the case of matching shown in FIG. 11(a), luminescence starts upon titration of the luminescence reagent, and the light attenuates when the ATP is consumed. The bioluminescence starting with the titration of the luminescence reagent varies with a short time constant dependent on the composition of the luminescence reagent, and suddenly rises after the start of titration and, after reaching a peak, steeply drops. Measurement of such a luminescence patter requires the driving of each transponder (TR3) at exactly the same timing. Simultaneous control using SID will prove effective in this respect. Though the number of TR3 is two in FIG. 11(a), especially where the number of TR3 is greater, it is possible to restrain output unevenness of the transponders by equalizing the time of accumulating signals from photosensors and equalizing the time of starting conversion by the ADC, and accordingly to acquire highly accurate data.

These sets of sensed data acquired by the reader/writer 203 are set to the application system device 204 for averaging of data, their totalization and comparison with other accumulated data, and DNA identification and the like are accomplished by using the sensed data that have been obtained.

In this embodiment, the actions of the transponder shown in FIG. 10 are such that, upon receipt of a UID request command Req_UID from the reader/writer, determination of identity between the slot transmitted at step 1001 and the slot generated on the basis of the UID is performed and, if the two slots are found identical, the transponder will transmit the UID to the reader/writer.

While the preferred embodiment of the present invention has been described with reference to a wireless bio-measuring system for measuring bio-molecules, which are DNAs in this case, by way of example, the invention is not limited to this embodiment, but the design can obviously be modified in various ways without deviating from the true spirit and scope of the invention. For instance, it can be applied to temperature measurement in sterilization of beverages heated for a short period of time or quality control of pharmaceuticals in their production plants. When it is applied to sterilization of milk or the like, a plurality of transponders each with a built-in temperature sensor can be used. In performing sterilization by heating at 100° C. for a few seconds, accurate temperature measurement for heat treatment can be achieved because a plurality of sets of data at the same point of time can be obtained.

Further, when it is to be used for testing a bio-sample, if for instance a plurality each of transponders each with a built-in photosensor and of transponders each with a built-in temperature sensor are used for measuring bioluminescence, a plurality of sets of data at the same point of time can be obtained, resulting in enhanced accuracy and reliability of the result of the bio-sample testing.

According to the invention, a unique identifier, which is an intrinsic identifier combining the transponder's intrinsic identifier and the sensor identifier of a sensor block is provided within each transponder, and simultaneous measurement by transponders each with a built-in sensor having the sensor identifier is made possible in response to a sensor measurement instruction by invalidating the transponder chip identifier out of unique identifiers. This makes it possible, even from measuring objects whose characteristics with the lapse of time, to obtain averages of a plurality of sets of sensor-sensed data at the same point of time to be obtained, which contributes to enhancing the accuracy and reliability of sensor-sensed data.

What is claimed is:

1. A reader/writer comprising:
a first coil antenna for carrying communication between a plurality of transponders each transponder including:
a sensor block having a sensor performing a prescribed measurement, and
a unique identifier combining a transponder chip identifier and a sensor identifier;
a communication circuit to which said first coil antenna is connected;
an oscillator;
a modulator for modulating an oscillation frequency generated by said oscillator and supplying the resultant modulated signals to said communication circuit;
a demodulator for demodulating signals resulting from the reception by said communication circuit of signals sent from said transponder via said first coil antenna; and
a control block for controlling said oscillator, said modulator, said communication circuit and said demodulator, provided with:
a command for invalidating a transponder chip identifier out of said unique identifiers in order to enable transponders each with a built-in prescribed sensor out of said plurality of transponders to start measurement.

2. The reader/writer according to claim 1, wherein:
said control block performs control on the basis of a control signal from an external application system device.

3. A sensing system comprising a plurality each of transponders each having one type of built-in sensor matching one type of measurement item for each type of measurement item, wherein:
a plurality of sets of data are acquired for each of a plurality of measurement items by performing communication between said plurality of transponders and the reader/writer;
each of said transponders has a sensor identifier matching the type of sensor, a transponder chip identifier intrinsic to each transponder, and an intrinsic unique identifier combining said transponder chip identifier and said sensor identifier; and
said reader/writer, in communicating with said transponders, transmits to transponders a command to invalidate the transponder chip identifier out of said unique identifiers, validates the type of sensor matching the measurement item, and causes said plurality of transponders having the same matching type of sensors to start measurement.

4. The sensing system according to claim 3, wherein:
said plurality of transponders transmit their respective unique identifier in response to a unique identifier request command from said reader/writer and, in response to the reception of an initialize execution command based on a sensor identifier from said reader/writer, transmits to said reader/writer an initialize completion command after executing initialization including the setting of a parameter unique to sensors matching a plurality of transponders having the same matching type of sensors.

5. The sensing system according to claim 4, wherein:
said reader/writer, after receiving said initialize completion command, invalidates a transponder chip identifier based on a sensor identifier matching the measurement item and transmits a measurement command to cause measurement to be started.

6. The sensing system according to claim 5, wherein:
a plurality of sets of sensed data obtained by simultaneous start of measurement by the transponders of said same type are subjected to averaging.

7. The sensing system, as set forth in claim 6, wherein:
said transponder chip has in the sensor itself a function to correct errors in sensor sensed data.

* * * * *